United States Patent Office 2,862,988
Patented Dec. 2, 1958

2,862,988

STORAGE BATTERY SEPARATOR

Edward R. Dillehay, Glen Ellyn, and Gordon H. Fernald, Geneva, Ill.

No Drawing. Original application August 11, 1948, Serial No. 43,767. Divided and this application May 17, 1954, Serial No. 432,904

1 Claim. (Cl. 136—146)

Our invention relates to separators for use between the plates of electric accumulators of the lead-acid type.

This application is a division of application Serial No. 43,767, filed August 11, 1948, now abandoned.

It is an object of our invention to provide a novel storage battery separator and mode of manufacture both of which are of low cost.

It is an object of our invention to provide a storage battery separator which has improved characteristics over those hitherto known and in particular a separator which is acid-proof, tough, non-brittle, stiff enough to permit easy handling in the building of the accumulator, and has a high porosity in spite of a minute pore size.

It is an object of our invention to provide a storage battery separator which may be handled dry, but which is readily wet by storage battery acid so as to possess a low resistance.

These and other objects of our invention, which will be set forth hereinafter or will be apparent to the skilled worker in the art, we accomplish in that article and composition and by that procedure of which we shall now describe an exemplary embodiment.

In the past it has been suggested that storage battery separators could be made by compounding a thermoplastic binder with a powdery substance which could be leached out or otherwise removed after the composition had been formed into sheets. Some successful storage battery separators have been made in this way but the process and product have presented a number of difficulties. It was a problem to incorporate into the composition a sufficient quantity of the removable substance to give the desired porosity without destroying the strength of the resultant product. The plastic body tended to be either too brittle or too soft, in which event it was characterized by cold flow and substantial shrinkage during manufacture. The processes hitherto employed for securing porosity were also complicated and expensive.

In the practice of our invention we have discovered that the desired qualities in the final product may be attained through the use of a combination of thermoplastic and thermosetting substances as hereinafter taught; that a high degree of porosity may readily be attained by the methods taught herein providing the composition is given particular characteristics; and that toughness and strength may be achieved along with stiffness and freedom from disadvantageous cold flow, in a separator made from a composition for which we shall now give an exemplary but non-limiting formula:

|  | Parts |
|---|---|
| Vinylite VYNS | 150 |
| Phenol furfural resin | 50 |
| Sulfonated castor oil (75%) | 50 |
| Cellosolve acetate | 150 |
| Salt (220 mesh) | 1,700 |

The above parts are by weight.

We shall now discuss the ingredients of this composition and the manner in which they coact to the desired end.

The vinylite VYNS is a copolymer of vinyl chloride and vinyl acetate containing approximately 7% of the acetate and having a high molecular weight. It contributes toughness to the storage battery separator. There are many variations of the vinyl compounds, and we may employ any of them which are tough polymers. We may employ straight vinyl chloride, copolymers of vinyl cloride and other substances, such as vinylidine chloride or a copolymer of vinyl chloride and vinyl acetate containing a high percentage of the acetate. Our preference is for the specific copolymer in the formula given above, as producing the best general properties in the separator.

The phenol furfural resin is formed by polymerizing phenol and the aldehyde in ways known in the art. As the resin is compounded with the other ingredients in the formula given above, we prefer to have it in a rather thin condition, i. e. with a viscosity substantially in the range of 500 to 1000 centipoises. Other thermosetting resins can be employed by us in the separator providing they are acid-proof in character and are compatible with the vinyl thermoplastic. For example, a one-stage or two-stage phenol formaldehyde resin is satisfactory provided it is used in the semi-liquid stage. We prefer the phenol furfural resin because of its superior acid resistance, good working qualities and excellent compatibility with the other ingredients of the composition.

The sulfonated castor oil we prefer to employ is the so-called 75% grade which contains that quantity of the pure sulfonated oil, the other 25% being impurities such as water. The sulfonated castor oil is a very important ingredient of our composition. It is not only a wetting agent, but also a plasticizer, permitting us to incorporate very large amounts of salt to obtain good working qualities. Without the sulfonated castor oil or with a wetting agent which cannot serve as a plasticizer, no more than about 1200 parts of salt could be incorporated into a composition otherwise of the formula given above, and even with 1200 parts the compound became very dry and difficult to handle and also brittle after the solvent had been removed and prior to the extraction of the salt. Under the extending and plasticizing action of the sulfonated castor oil, we are able to add so large an amount of salt as to lower the resistance of the separator to practically any value desired.

With the amount of salt given in the formula above, we obtain a nice working composition for the extraction and calendering operations, which composition is non-brittle after the solvent has been removed and has the right consistency for the finished separator.

We have further found that sulfonated castor oil acts as a lubricant, preventing the sticking of the compound to the calender, extrusion machine, or other equipment employed in the process. As a wetting agent, the sulfonated oil permits a very much more rapid extraction of the salt. Without it, even with the necessarily smaller quantity of salt, about two hours was required to extract a separator, whereas with the sulfonated oil, the extraction can be accomplished in about 20 minutes.

As a permanent wetting agent, the sulfonated castor oil is very satisfactory. Our separators can be completely dried, but when they are again immersed in battery acid, they become wetted immediately and regain their original low resistance. With the incorporation of the sulfonated castor oil into the composition, no treatment of the final separators to render them wettable is required.

"Cellosolve acetate" is ethyl glycol monoethyl ether acetate and is compatible with water. It is employed by us as a solvent and initial extender of the binder substances which facilitates the mixing in of a large quantity of salt. We can, however, use a variety of other solvents for the purpose, such as methyl ethyl ketone, furfural, acetone, any of the ketone-type solvents, and mixtures of these substances. The solvent employed should be one easily removed and relatively inexpensive.

The salt contemplated in the above formula is preferably sodium chloride ground to a fine powder. It has the advantage of great cheapness, is readily removed by leaching with water, and is completely satisfactory in every way. We may employ any other soluble inorganic salts readily and completely removable by leaching, as well as leachable substances which are not inorganic salts, such as pulverized sugar or pulverized urea crystals. Our preference is for the sodium chloride for reasons given above. More expensive materials would need to be recovered in order to make their use economical, while a substance requiring the use of a special solvent for leaching entails an additional expense.

Any leachable substance used for porosity should be finely divided. We grind our salt to 200-mesh size or smaller. We have found that a material, all of which will pass through the standard screen of 200 meshes to the inch is fine enough, but a smaller pore size can readily be obtained by grinding to still smaller sizes.

In processing our composition and separators, we combine the ingredients, such as those set forth in the formula above, in a suitable mixer at a temperature preferably around 180° F. to 200° F. Any ribbon or blade-type mixer may be employed, or we may use a pressure mixer such as the Banbury. In our preferred method of mixing the vinylite in the form of a powder is thoroughly blended with the 200 mesh salt. The thermo-setting resin is separately dissolved in the solvent, with or without the addition of the plasticizer. Then the liquid ingredients are added to the dry pre-blend first mentioned.

Mixing is continued until the composition is homogenous. The finished composition has a soft dough-like consistency, and is formed into thin sheets in any suitable way. For example, the composition may be calendered in a two-roll calender against a steel plate which is grooved to form the desired ribs on the separator. It is preferable and less expensive in large-scale production to extrude the material from an orifice in an extrusion machine, which orifice is shaped to provide a continuous, thin, sheet-like ribbon with preformed ribs.

From the extrusion machine or other means whereby the composition is formed into sheets or continuous lengths, it passes to an oven where the solvent or solvents are eliminated by vaporization, and the thermosetting resin is set up. The solvent may be recovered, for economy. The temperature and time of treatment will depend upon the nature of the resin, and since they are within the capabilities of the skilled worker to select, they form no necessary limitation on this invention.

After drying and curing, the sheets or lengths are subjected to a washing operation, either continuous or batch, in which they are immersed in moving water at a temperature preferably around 150 to 180° F. The water should be flowing so as to be renewed when it becomes laden with salt, and it may further be agitated with air if desired.

When the salt has been removed from the separator material, it will be in a porous condition, and may be dried. It is then cut apart into individual separators, as may be required, which are packed for shipment.

Our separators have about one-fourth the resistance of the so-called microporous rubber separators, do not shrink unduly when cooled, and have a very satisfactory zero discharge test.

Modifications may be made in our invention without departing from the spirit of it. Having thus described our invention in an exemplary embodiment, what we claim as new and desire to secure by Letters Patent is:

A storage battery separator which is a sheet-like, highly porous body consisting of the following ingredients in substantially the proportions indicated:

| | Parts |
|---|---|
| Vinylite resin | 150 |
| Phenol furfural resin | 50 |
| Commercial sulfonated castor oil | 50 | the parts being by weight.

References Cited in the file of this patent
UNITED STATES PATENTS

| 2,189,889 | Engel | Feb. 13, 1940 |

FOREIGN PATENTS

| 900,804 | France | July 10, 1945 |